United States Patent Office 3,429,875
Patented Feb. 25, 1969

3,429,875
OXIDATION OF 3-HYDROXY-17-ALKYNYL-STEROIDS
Max Salomon de Winter, Pieter Modderman, and Johannes Kloosterman, Oss, Netherlands, assignors to Organon Inc., West Orange, N.J., a corporation of New Jersey
No Drawing. Filed Mar. 28, 1966, Ser. No. 537,691
Claims priority, application Netherlands, Dec. 31, 1965, 6517213
U.S. Cl. 260—239.55    6 Claims
Int. Cl. C07c 167/00, 169/22

ABSTRACT OF THE DISCLOSURE 3,5α,17β-trihydroxy-6β-methyl - 17α - alkynyl-steroids and their 17-derivatives are oxidized to the corresponding 3-keto compounds with a lead-tetra acylate, such as lead tetra-acetate, in a basic medium. The products produced are intermediates in the preparation of active ovulation inhibiting agents.

---

The invention relates to an improved method for the oxidation of a certain group of 3-hydroxy-steroids.

More particularly, it relates to an improved oxidation method of 3,5α,17β-trihydroxy-6β-methyl - 17α - alkynyl-steroids, or 17-derivatives thereof, into the corresponding 3-keto-compounds.

A known group of compounds are the 6-methyl-17α-alkynyl-(19-nor)-testosterones, which possess particularly valuable biological properties. An important compound of this group is i.a. the 6α,21-dimethyl-17α-propynyl-testosterone (dimethisterone), which on account of its orally active ovulation inhibiting properties is used as an anticonceptive.

A conventional method for the preparation of the above compounds consists in that a Δ⁵-3-acyloxy compound, having already in 17-position the substituents indicated, is converted by oxidation with a per acid and subsequent treatment of the thus obtained 5α,6α-oxido-steroid with, for example, methyl magnesium bromide, followed by hydrolysis, into the 3,5α-dihydroxy-6β-methyl compound, after which by oxidation of the 3-hydroxyl group, dehydration of the 5α-hydroxyl group while forming a Δ⁴-bond, and isomerization of the 6β-methyl group, the desired compound is obtained.

A difficult and vulnerable reaction step in this synthesis is the oxidation of the 3-hydroxyl compound to the corresponding 3-keto compound. Although such a conversion generally does not yield special problems, these difficulties do occur in the present process, i.a. owing to the presence of the 17β-hydroxy-17α-alkynyl groupings which is very sensitive to oxidizing agents. For under the influence of all the oxidants applied so far for the relative conversion this grouping is affected, causing thereby undesired side-products, which has, of course, an unfavourable effect on the yield of this oxidation. The side-reactions do not only occur with the use of chromic acid applied usually in this oxidation, but also with potassium permanganate, both in acid and alkaline medium, with potassium chromate, with N-bromosuccinimide or with N-bromoacetamide. The extent to which the side-reactions occur, particularly 17-keto formation, under the influence of the said oxidants, is such that all these agents are entirely unsuitable for the present conversion. In general only a few percent yield of desired final product is obtained. The only oxidant applied so far, which under certain circumstances still yields somewhat reasonable results is chromic acid, but then as chromic acid pyridine/complex.

Another disadvantage of these conventional oxidants is in addition that under certain circumstances partial dehydration occurs at the same time while splitting off the 5-hydroxyl group, by which a mixture of final products is formed, which in their turn require separation and purification again.

As mentioned before, chromic acid in the form of a pyridine complex has proved suitable only. A disadvantage of chromic acid specifically, hence also of this complex, is that this compound is most self-inflammable, rendering special precautions necessary, such as the processing in small portions at a time.

It has been found in accordance with the present invention that the relative oxidation can be performed in a most advantageous manner with a lead-tetra acylate in a basic medium.

The use of lead-tetra acylate as oxidant for the present conversion has shown a number of most surprising effects.

In view of the results with other oxidants it might have been expected that lead-tetra acylate, too, would effect undesired conversions in ring D. Surprisingly such side-reactions do not occur, however.

In view also of the fact mentioned before, the yields obtained with a lead-tetra acylate are considerably higher than those obtained with the oxidants used hitherto. The latter give yields, varying from only a few percent with the use of the majority of the known oxidants to at most 60–65% of pure final product with the use of chromic acid/pyridine, whereas with the process according to the invention yields of 90% or more of the 3-keto-steroids are obtained. In this connection the isolation and purification, too, of the desired product are much easier and cheaper.

Another also surprising advantage is that the reaction proceeds much quicker than with the application of other oxidants, such as chromic acid, rendering shorter reaction periods possible.

A further advantage in comparison with chromic acid/pyridine is that lead-tetra acylates do not give spontaneous combustion, so that this process is suitable indeed for large-scale production.

The process according to the invention is now characterized in that compounds are prepared of the formula:

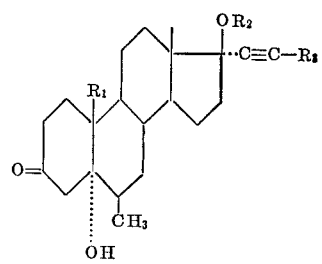

in which $R_1$ = H or $CH_3$
$R_2$ = H, an acyl or hydrocarbon radical, and
$R_3$ = H or an alkyl group by oxidation of the corresponding 3-hydroxy compound with a lead-tetra acylate in a basic medium.

For example, $R_2$ can be an organic carboxylic acid radical having 1–12 carbon atoms and an ether radical selected from a lower alkyl group and a tetrahydro pyranyl ether group, and $R_3$ can be methyl, ethyl or propyl.

The lead-tetra acylate to be applied in the present process is preferably lead-tetra acetate, because this substance is the most accessible one, which has moreover given so far the best results as regards yield and velocity of the reaction, but other acylates are suitable as well, such as those derived from propionic acid, butyric acid, isobutyric acid, pivalic acid, lauric acid, benzoic acid or cyclohexyl acetic acid.

The oxidation according to the invention must be performed in a basic medium. This can be attained by taking either a solvent or a mixture of solvents, one or more having basic properties, or by using one or more solvents, which are themselves not basic or not sufficiently basic, and addition of a base or a mixture of bases. Such a base or mixture of bases may of course be added also when using a solvent having itself already basic properties.

To the first group of solvents belong organic amines, of which are mentioned particularly tertiary amines, such as trimethyl amine, methyldiethyl amine, N-methylpiperidine, pyridine, picoline, lutidine, collidine and quinoline.

To the second group belong i.a. aromatic hydrocarbons, such as benzene and toluene, halogenated hydrocarbons and further ethyl acetate, acetonitril, dimethyl formamide, dimethyl acetamide and the like.

The base applied in the present process is preferably selected from the group of metal carbonates, such as potassium carbonate, but other bases, too, are possible, such as alkali metal alcoholates, for example, sodium methanolate or potassium ethanolate, and alkali metal or alkaline earth metal hydroxides.

It has proved advantageous to use a mixture of bases, one of the components of which has water-binding properties, for instance, calcium oxide.

A particularly workable form of process consists in that as a solvent is applied acetonitrile, possibly in the presence of one or more solvents, as base an alkali metal carbonate, such as potassium carbonate, and as a second basic component the water-binding calcium oxide.

The process according to the invention is usually performed by dissolving the relative steroid in one or more of the solvents mentioned, addition of the desired amount of lead-tetra-acylate, and, if desired, a base, followed, if desired, by the addition of a water-binding substance. This mixture is stirred for some time at a certain temperature, after which the desired compound can be isolated.

The lead-tetra-acylate is preferably applied in a ratio of 1½:5 mol per mol steroid.

The reaction periods vary from half an hour to 24 hours, and the reaction temperature from 15–65° C.

The invention is further illustrated by the following examples:

EXAMPLE I

A mixture of 200 gm. of 3β,5α,17β-trihydroxy-6β-methyl-17α-propynyl-androstane, 100 gm. of potassium carbonate, 100 gm. of calcium oxide and 6000 ml. of acetonitril is heated to 50° C. while stirring. Next 500 gm. of lead-tetra acetate are added, after which the reaction mixture is further stirred for 1½ hours at 50° C. Subsequently 3 litres of chloroform are added, after which the reaction mixture is filtered over hyflo. The hyflo cake is washed with chloroform, after which 2 litres of water are added to the organic solution. The organic solvents are next evaporated under reduced pressure, after which the aqueous suspension is kept at 50° C. for 1 hour, the precipitate formed sucked off, washed with water and dried in vacuo at 90° C., to obtain the 3 - keto - 5α,17β-dihydroxy-6β-methyl-17α-propynyl-androstane in a yield of 91% by weight. Melting point: 234–237° C.; $[\alpha]_D^{20} = -40°$ (chloroform).

Analogous results were obtained with lead-tetra-propionate and lead-tetra-pivalate.

Comparative experiment with chromic acid/pyridine

In a 100-ml. flask 2.8 gm. of chromic acid are added very gently and portion-wise, while stirring, leading through nitrogen, at 5° C., to 20 ml. of pyridine. After formation of the chromic acid/pyridine complex, 3 gm. of 3β,5α,17β - trihydroxy - 6β - methyl - 17α-propynyl-androstane are added, keeping the temperature at 5–8° C. The suspension obtained in this manner is next stirred for 16 hours, whereupon the excess of chromic acid is removed by the addition of a sodium sulphite solution. The oxidation product is extracted by means of ethyl acetate, the extract washed 3 times with water, 3 times with dilute hydrochloric acid, twice with a sodium bicarbonate solution until weakly alkaline and finally with water until neutral. The ethyl acetate is evaporated in vacuo while adding water simultaneously. The solid residue is next sucked off and dried. Dry weight about 2.3 gm. The residue is suspended in as little ethyl acetate as possible, whereupon 35 ml. of petroleumether are added, after which the mixture is refluxed for 1 hour. The mixture is next kept at room temperature during 1 night, next filtered, washed with little ethyl acetate-petroleumether (1:3) and finally with petroleumether, whereupon the 3 - keto - 5α,17β - dihydroxy-6β-methyl-17α-propynyl-androstane is obtained. Yield about 62%. Melting point: 241°–242° C.; $[\alpha]_D^{20} = -42.7°$ C. (chloroform).

EXAMPLE II

A solution of 200 gm. of 3β,5α,17β-trihydroxy-6β-methyl-17α-butynyl-androstane, 6000 ml. of pyridine and 750 gm. of lead-tetra acetate are stirred for 16 hours at 30° C., whereupon 3 litres of cholorform are added to the reaction mixture. The mixture is next filtered over hyflo, the hyflo cake washed with chloroform, the organic solution successively washed with a dilute hydrochloric acid solution, with a dilute sodium hydroxide solution and finally with water until neutral, whereupon the remaining chloroform solution is processed according to the process described in Example I, leading to the 3-keto-5α,17β-dihydroxy-6β-methyl-17α-butynyl-androstane in a yield of 90% by weight.

In an analogous manner the 3β,5α,17β-trihydroxy-6β-methyl-17α-ethynyl - 19 - nor - androstane is converted by means of lead-tetra isobutyrate into the corresponding 3-keto-compound.

EXAMPLE III

A mixture of 100 gm. of 3β,5α,17β-trihydroxy-6β-methyl-17α-propynyl-androstane, 2 litres of acetonitrile one litre of benzene, 80 gm. of sodium methanolate and 415 gm. of lead-tetra-acetate is stirred for 3 hours at 40° C., whereup the reaction mixture is cooled and adjusted to pH 7 with 50% acetic acid. The mixture is next processed by the process described in Example I to obtain the corresponding 3-keto compound after crystallization from methanol in a yield of 89% (melting point: 236–238° C.).

Analogous results were obtained by means of lead-tetra benzoate.

What is claimed is:
1. Process for the preparation of compounds of the formula:

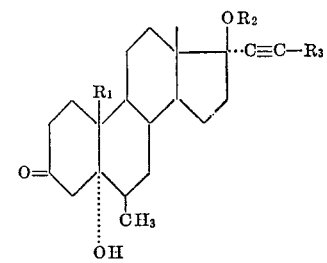

wherein
    $R_1$ is selected from the group consisting of hydrogen and a methyl group,
    $R_2$ is selected from the group consisting of hydrogen, an acyl group and a hydrocarbon radical, and $R_3$ is selected from the group consisting of hydrogen and an alkyl group by oxidation of the corresponding 3-hydroxy-compound with a lead-tetraacylate in a basic medium.

2. Process according to claim 1, wherein as starting-product is applied a compound as defined in claim 1, in which $R_1$ is selected from hydrogen and a methyl group, $R_2$ is selected from hydrogen, an organic carboxylic acid radical having 1–12 carbon atoms and an ether radical selected from a lower alkyl group and a tetrahydro pyranyl ether group, and $R_3$ is selected from hydrogen, a methyl, ethyl and propyl group.

3. Process according to claim 1, in which said basic medium is a tertiary amine solvent.

4. Process according to claim 1, in which said basic medium is a mixture of a substantially neutral solvent and a basic compound selected from the group consisting of an alkali metal carbonate, an alkali metal alcoholate, and an alkali metal or alkaline earth metal hydroxide.

5. Process according to claim 1 in which said basic medium is a mixture of a substantially neutral solvent and a basic compound selected from the group consisting of an alkali metal carbonate, an alkali metal alcoholate, and an alkali metal or alkaline earth metal hydroxide, which further includes a basic compound having water-binding properties.

6. Process according to claim 1, in which said basic medium is a mixture of a substantially neutral solvent and a basic compound selected from the group consisting of an alkali metal carbonate, an alkali metal alcoholate, and an alkali metal or alkaline earth metal hydroxide, which further includes calcium oxide as a water-binding compound.

References Cited

Immer et al., Helv. Chim. Act. 45, 753–770 (1962) (pp. 754 and 762 relied on).

LEWIS GOTTS, *Primary Examiner.*

E. G. LOVE, *Assistant Examiner.*

U.S. Cl. X.R.

260—397.4